United States Patent [19]

Rutkowski

[11] Patent Number: 5,613,406
[45] Date of Patent: Mar. 25, 1997

[54] ROTATING SLIDE-N-SNAP

[75] Inventor: Gregory M. Rutkowski, St. Clair Shores, Mich.

[73] Assignee: Teleflex Incorporated, Plymouth Meeting, Pa.

[21] Appl. No.: 548,579

[22] Filed: Oct. 26, 1995

[51] Int. Cl.$^6$ ..................................................... F16C 1/10
[52] U.S. Cl. ........................... 74/502.6; 248/27.3; 248/56
[58] Field of Search ............................. 74/502.4, 502.6; 403/353, 326, 327, 328; 248/56, 27.3, 71, 222.52; 24/590, 702, 595; 174/161 F

[56] References Cited

U.S. PATENT DOCUMENTS

| | | | |
|---|---|---|---|
| 2,291,430 | 7/1942 | Ingersoll | 248/56 X |
| 2,445,009 | 7/1948 | Strauss et al. | 174/161 F X |
| 2,757,962 | 8/1956 | MacLeod | 248/56 X |
| 4,346,863 | 8/1982 | Zeitrager et al. | 248/56 X |
| 4,474,489 | 10/1984 | Simon | 248/56 X |
| 4,763,541 | 8/1988 | Spease . | |
| 4,936,161 | 6/1990 | Polando | 74/502.4 X |
| 4,951,524 | 8/1990 | Niskanen . | |
| 5,161,428 | 11/1992 | Petruccello | 74/502.4 |
| 5,272,934 | 12/1993 | Chegash et al. . | |
| 5,347,882 | 9/1994 | Klotz | 74/502.4 |

*Primary Examiner*—Charles A. Marmor
*Assistant Examiner*—Saul J. Rodriguez
*Attorney, Agent, or Firm*—Howard & Howard

[57] ABSTRACT

A fitting (26) for rotatably supporting a conduit (22) in a bulb-shaped slot in a wall (20). The fitting (26) has a pair of spaced parallel flats (38, 40) defining a minor dimension for sliding into the narrow entrance (14) to the circular seat (16) of the slot and a larger circular major dimension (36) for rotating into a locked position crossways the entrance (14) to prevent removal of the fitting (26) from the slot. A radial web acts as a stop (50) to prevent backward insertion of the fitting into the slot and for engaging the edge of the entrance (14) in the locked position to prevent the retention arm (46) from overriding the retainer recess (18).

11 Claims, 3 Drawing Sheets

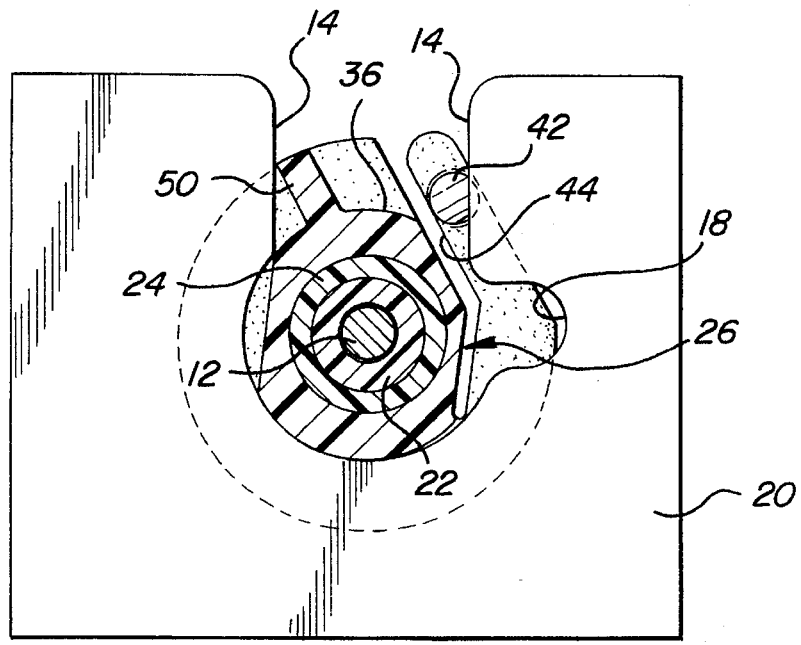
FIG-4
FIG-5
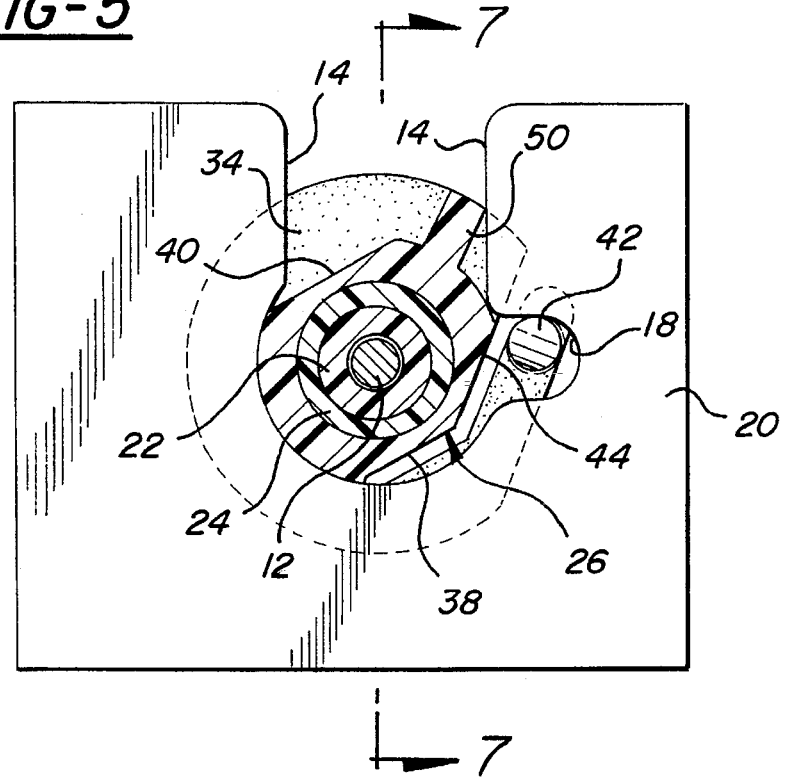

ROTATING SLIDE-N-SNAP

TECHNICAL FIELD

The subject invention relates to motion transmitting remote control assemblies of the type for transmitting motion in a curved path by a flexible motion transmitting core element, and more particularly, to fittings for supporting such assemblies as they pass through a support structure, such as a bulkhead or bracket.

BACKGROUND OF THE INVENTION

Motion transmitting remote control assemblies require support fittings for attachment to support structure such as a wall, bulkhead, bracket, or the like. A class of such fittings known to the prior art present a pair of flanges for engaging a U-shaped slot in a wall with an L-shaped arm presenting a projection for snapping into a hole or recess to retain the fitting in the slot. Examples of fittings falling in this class are disclosed in U.S. Pat. Nos. 4,763,541 to Spease, 4,951,524 to Niskanen and 5,272,934 to Chegash et al, all assigned to the assignee of the subject invention.

Such assemblies work very well for supporting a conduit in a slot where the conduit is not likely to experience forces which could "pop" the conduit out of the slot.

SUMMARY OF THE INVENTION AND ADVANTAGES

A motion transmitting remote control assembly of the type for transmitting motion in a curved path by a flexible motion transmitting core element while being supported in a bulb-shaped slot having a narrow entrance and wider seat and an adjacent retainer. The assembly comprises a conduit having a bore extending along its longitudinal axis for movably supporting the flexible motion transmitting core element in the bore of the conduit. A fitting is supported on the conduit and presents a pair of spaced abutments extending radially of the conduit axis for engaging opposite faces of the wall defining the slot with a body portion disposed between the abutments. The assembly is characterized by the body portion having a minor dimension transverse to the axis for moving through the narrow entrance of the slot and a major dimension transverse to the axis and the minor dimension for extending across the wider seat of the slot in a locked position to prevent the fitting from being removed from the slot without realignment of the minor dimension with the narrow entrance to the slot.

Accordingly, the fitting may be inserted into the bulb-shaped slot to a seated position and rotated with the major dimension preventing the fitting from being removed from the slot.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 is a cross sectional view like FIG. 2 but showing the fitting in the seated position;

FIG. 5 is a cross sectional view like FIGS. 2 and 4 but showing the fitting in the seated and locked position;

DETAILED DESCRIPTION OF THE PREFERRED EMBODIMENT

Figure 7:
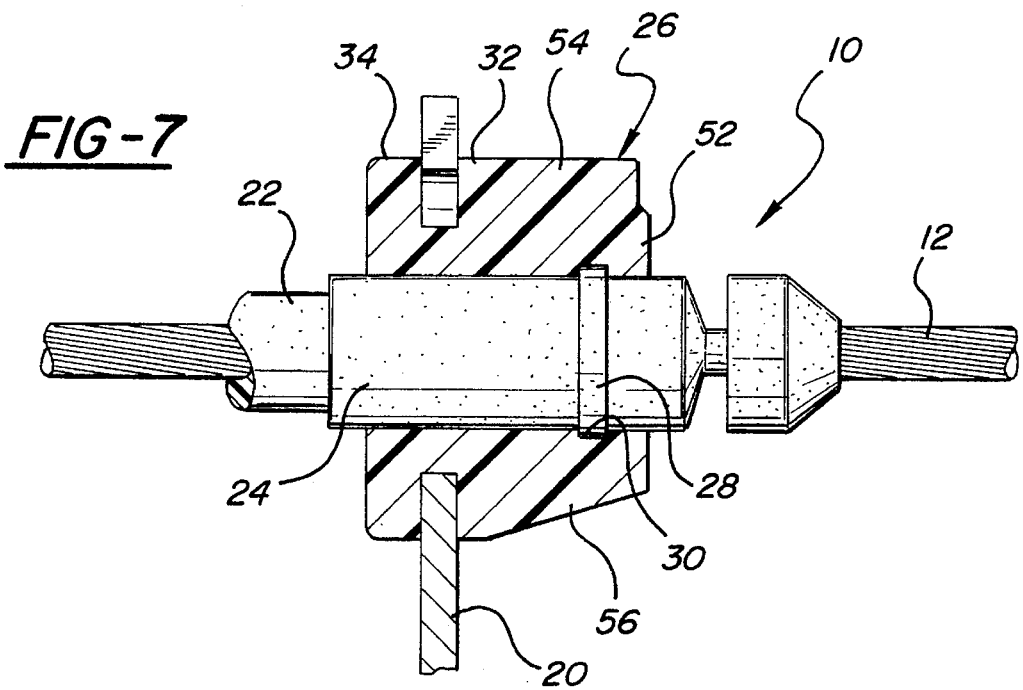
FIG. 7 is a cross sectional view taken substantially along line 7—7 of FIG. 5.

Referring to the Figures, wherein like numerals reference like or corresponding parts throughout the several views, a motion transmitting remote control assembly is generally shown at 10 in FIG. 7. The motion transmitting remote control assembly transmits motion in a curved path by a flexible motion transmitting core element 12 while being supported in a bulb-shaped slot having a narrow entrance 14 and wider seat 16 and an adjacent retainer or hole 18, in a wall, bracket, bulkhead, or the like, 20.

The assembly comprises a conduit 22 having a bore extending along its longitudinal axis with the flexible motion transmitting core element 12 movably supported in the bore of the conduit. The conduit 22 is of the type well known in the art including an inner tubular member made of plastic and surrounded by wire-like filaments disposed helically on a long lead and encased in an extruded plastic casing. The core element 12 is a solid wire or stranded filaments, as illustrated.

A ferrule 24 is secured to the conduit 22 by being molded of organic polymeric material so as to bond to the conduit, as is well known in the art.

A fitting, generally indicated at 26, is made of organic polymeric material and is supported on the conduit 22 by being rotatably supported on the ferrule 24. The ferrule 24 includes an annular rib 28 rotatably disposed in a complementary annular groove 30 in the fitting 26. The fitting 26 presents a pair of spaced abutments extending radially of the conduit axis for engaging opposite faces of the wall 20, which defines the slot shaped by the entrance 14 and the seat 16. The abutments are defined by inner 32 and outer 34 generally circular flanges and the fitting 26 includes an axially extending body portion disposed between the flanges 32 and 34. The assembly 10 is characterized by the body portion having a minor dimension transverse to the conduit axis for moving through the narrow entrance 14 of the slot and a major dimension transverse to the conduit axis and the minor dimension for extending across the wider seat 16 of the slot in a locked position to prevent the fitting from being removed from the slot without realignment of the minor dimension with the narrow entrance to the slot. More specifically, the major dimension is defined by a cylindrical surface 36 extending between the flanges 32 and 34 while the minor surface is defined by parallel flats 38 and 40. The flats being 38 and 40 are in sliding and guiding engagement with the parallel edges 14 of the entrance to the slot during insertion into the seat 16.

Figure 1:
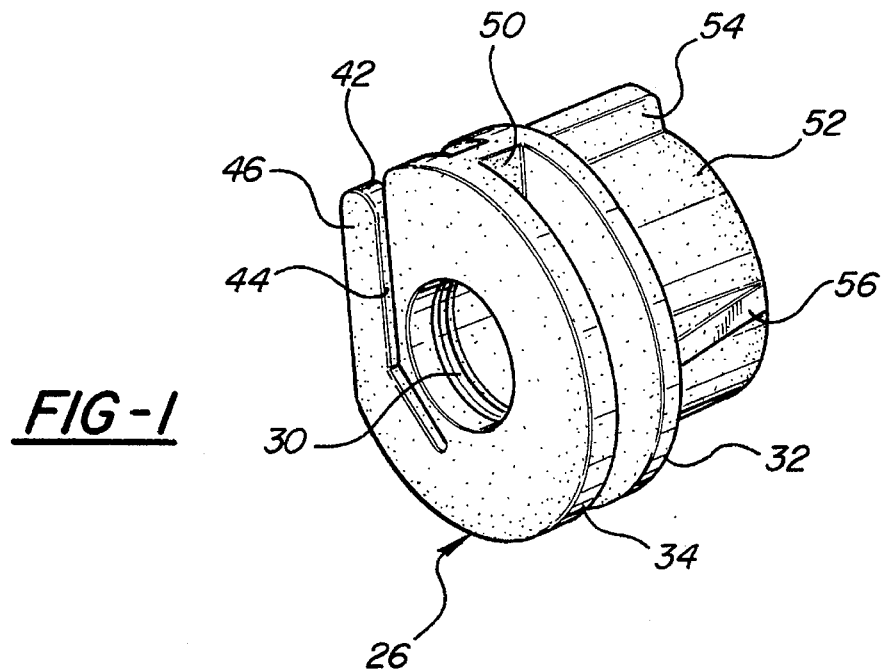
FIG. 1 is a perspective view of the fitting of the subject invention absent being mounted on the conduit.
Figure 3:
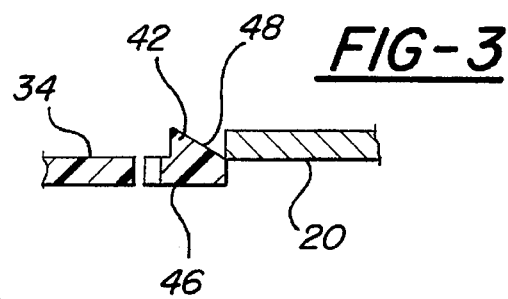
FIG. 3 is a fragmentary cross sectional view taken substantially along 3—3 of FIG. 2.

The fitting 26 includes a gripping projection 42 for moving into engagement with the retainer 18 to prevent the realignment of the parallel sides 38 and 40 defining the minor dimension with the narrow entrance 14 to the slot. The gripping projection 42 extends axially into the space between the flanges 32 and 34. The outer flange 34 includes a slit 44 having a dog-legged shape defining a cantilevered and dog-legged arm 46 supporting the gripping projection 42 at the distal end thereof, the arm 46 being flexible about its connection to the flange 34. The projection 42 presents a ramp 48, as shown in FIG. 3, for ramping up and over the wall 20 and dropping into the retainer recess 18 as the arm 46 flexes. A stop 50 is disposed between the flanges 32 and 34 and the gripping projection 42 is spaced circumferentially about the conduit axis an angle from the stop 50 so that the stop 50 engages the edges of the entrance 14 to the slot when the gripping projection 42 engages the retainer recess 18 to prevent the gripping projection 42 from overrunning the retainer recess 18, as best illustrated in FIG. 5. The stop 50 comprises a web extending between the inner 32 and outer 34 flanges and one side of the web extends radially of the conduit axis. In other words, the one side of the web, as well as its radial axis, is perpendicular to the axis of the conduit.

The fitting 26 also includes a cylindrical section 52 extending axially from the inner flange 32 and strengthening webs 54 and 56 extending between the cylindrical section 52 and the inner flange 32. The strengthening webs 54 are rectangular whereas the strengthening webs 56 are triangular and disposed ninety degrees from the rectangular webs 54.

Figure 2:
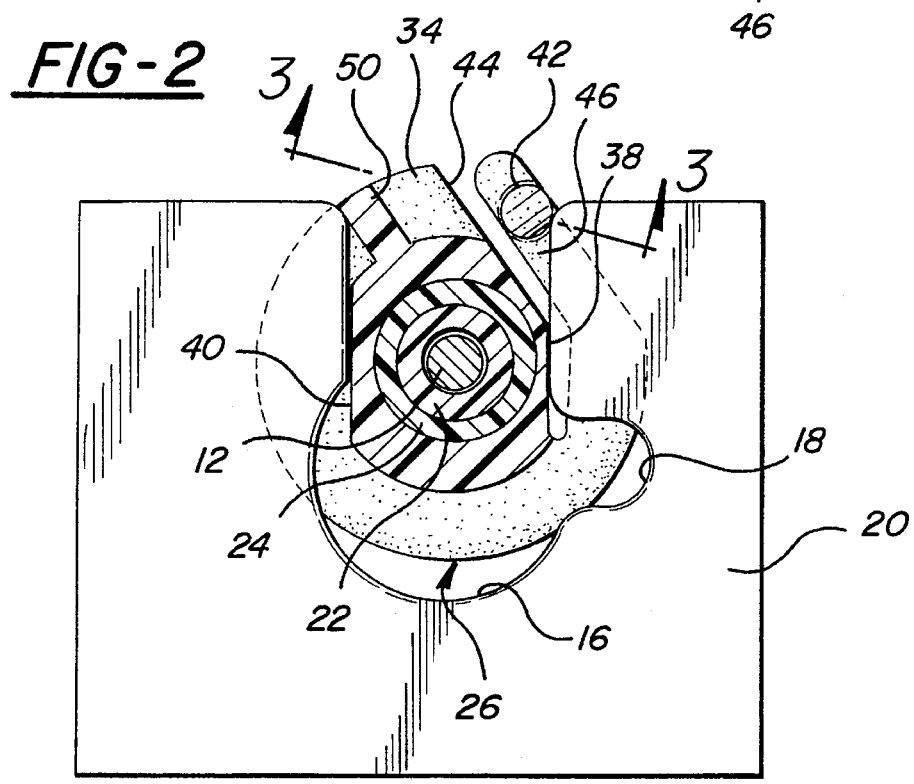
FIG. 2 is a cross sectional view of the fitting of FIG. 1 during initial insertion into a bulb-shaped slot.
Figure 6:
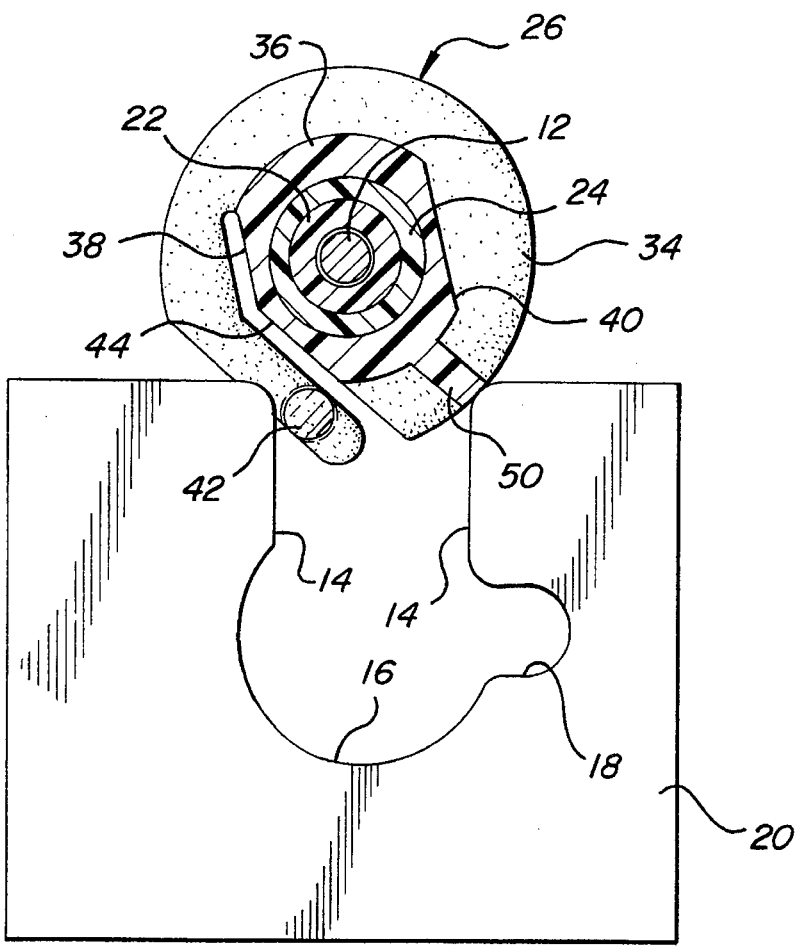
FIG. 6 is a cross sectional view like FIG. 2 but showing the fitting prevented from being inserted in the wrong direction.

In the event the installer inserts the fitting into the entrance 14 in the wrong direction, the stop 50 combines with the major dimension 36 to prevent the fitting from entering the entrance 14, i.e., the combined expanse of the stop 50 and the major dimension 36 is greater than the width of the entrance 14 to the slot. On the other hand, when installed properly, as shown sequentially in FIGS. 2, 4 and 5, respectively, the flats 38 and 40 defining the minor dimension, slide along the edges of the narrow entrance 14, followed by the gripping projection engaging one edge of the entrance 14 as the stop 50 engages and slides along the opposite edge of the entrance 14. When the lower extremity 36 of the major dimension engages the bottom of the bulb or circular seat 16, the fitting 26 is manually rotated about the ferrule 24 whereby the ramp 48 on the end of the gripping projection 42 ramps up and over the edge of the entrance 14 to flex the arm 46 to thereby allow the projection 42 to slide over the surface of the wall 20 until it reaches the retainer recess 18, whereupon the resilient arm 46 snaps back to hold the projection 42 in the retainer recess 18. In this seated and locked position, the stop 50 limits rotation of the fitting 26 by engaging the edge of the entrance 14, thus, preventing the projection 42 from riding up and over the far edge of the retainer recess 18. The fitting 26 is locked in the seat 16 because the major dimension 36 extends crossways the seat 16 extending a greater width than the width of the entrance 14, thereby preventing the fitting being removed from the slot without the flats 38 and 40 being realigned with the entrance 14.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A motion transmitting remote control assembly (10) of the type for transmitting motion in a curved path by a flexible motion transmitting core element (12) while being supported in a bulb-shaped slot having a narrow entrance (14) and a wider seat (16) and an adjacent retainer (18), said assembly comprising;

a conduit (22) having a bore extending along its longitudinal axis, a flexible motion transmitting core element (12) movably supported in said bore of said conduit (22), a fitting (26) supported on said conduit (22) and presenting a pair of spaced abutments (32, 34) extending radially of said axis for engaging the slot, said fitting (26) including a body portion disposed between said abutments (32, 34), said assembly characterized by said body portion having a minor dimension (38, 40) transverse to said axis for moving through the narrow entrance (14) of the slot and a major dimension (36) transverse to said axis and said minor dimension (38, 40) for extending across the wider seat (16) of the slot in a locked position to prevent said fitting (26) from being removed from the slot without realignment of said minor dimension (38, 40) with the narrow entrance (14) to the slot, and a gripping projection (42) for moving into engagement with the retainer (18) to prevent realignment of said minor dimension (38, 40) with the narrow entrance to the slot.

2. An assembly as set forth in claim 1 wherein said fitting (26) is rotatably supported on said conduit (22) for rotation about said axis relative to said conduit (22).

3. An assembly as set forth in claim 2 including a ferrule (24) secured to said conduit (22) and rotatably supporting said fitting (26).

4. An assembly as set forth in claim 3 wherein said fitting (26) and said ferrule (24) are made of organic polymeric material.

5. An assembly as set forth in claim 1 wherein said gripping projection (42) extends axially into the space between said abutments (32, 34), and including a stop (50) disposed between said abutments (32, 34), said gripping projection (42) being spaced circumferentially about said axis from said stop (50) for engaging the edge of the entrance (14) to the seat (16) when said gripping projection (42) engages the retainer (18) to prevent said gripping projection (42) from overrunning the retainer (18).

6. An assembly as set forth in claim 5 wherein said abutments (32, 34) comprise inner (32) and outer (34) generally circular flanges, said outer (34) flange including a slit (44) defining a cantilevered arm (46) supporting said gripping projection (42) at the distal end thereof, said arm (46) being flexible and said projection (42) presenting a ramp (48) for ramping up and over the wall and dropping into the retainer (18) as said arm (46) flexes.

7. An assembly as set forth in claim 6 wherein said major dimension (36) is defined by a cylindrical surface (36) extending between said flanges (32, 34) and said minor surface is defined by parallel flats (38, 40), said flats (38, 40) being in sliding and guiding engagement with the entrance (14) to the seat (16) during insertion into the seat (16).

8. An assembly as set forth in claim 7 wherein said slit (44) has a dog-legged shape.

9. An assembly as set forth in claim 8 wherein said stop (50) comprises a web extending between said flanges (32, 34).

10. An assembly as set forth in claim 9 wherein one side of said web extends radially of said axis.

11. An assembly as set forth in claim 10 wherein said fitting (26) includes a cylindrical section (52) extending axially from said inner (32) flange and strengthening webs (54, 56) extending between said cylindrical section (52) and said inner (32) flange.

* * * * *